(12) United States Patent
Tonomura et al.

(10) Patent No.: US 9,849,610 B2
(45) Date of Patent: Dec. 26, 2017

(54) INDUCTION HEATING DEVICE FOR MOLD

(71) Applicants: BRIDGESTONE CORPORATION, Tokyo (JP); TOKUDEN CO., LTD., Kyoto-shi, Kyoto (JP)

(72) Inventors: Toru Tonomura, Otsu (JP); Yasuhiro Fujimoto, Kyoto (JP); Yoshihiko Yamamura, Takashima (JP); Hideyuki Osamura, Otsu (JP); Akihiko Hajikano, Kodaira (JP)

(73) Assignees: TOKUDEN CO., LTD., Kyoto-shi, Kyoto (JP); BRIDGESTONE CORPORATION, Tokyo (JP)

( * ) Notice: Subject to any disclaimer, the term of this patent is extended or adjusted under 35 U.S.C. 154(b) by 367 days.

(21) Appl. No.: 14/420,571

(22) PCT Filed: Aug. 6, 2013

(86) PCT No.: PCT/JP2013/071212
§ 371 (c)(1),
(2) Date: Feb. 9, 2015

(87) PCT Pub. No.: WO2014/024864
PCT Pub. Date: Feb. 13, 2014

(65) Prior Publication Data
US 2015/0217484 A1    Aug. 6, 2015

(30) Foreign Application Priority Data
Aug. 8, 2012    (JP) .................................. 2012-176415

(51) Int. Cl.
*H05B 6/14* (2006.01)
*B29C 33/06* (2006.01)
(Continued)

(52) U.S. Cl.
CPC .......... *B29C 33/06* (2013.01); *B29D 30/0662* (2013.01); *H05B 6/105* (2013.01);
(Continued)

(58) Field of Classification Search
CPC .......... B29C 33/06; H05B 6/105; H05B 6/36; H05B 6/108; H05B 6/14; H05B 6/44;
(Continued)

(56) References Cited

FOREIGN PATENT DOCUMENTS

CN    102783248 A    11/2012
CN    203542943 U  *  4/2014
(Continued)

OTHER PUBLICATIONS

State Intellectual Property Office of the People's Republic of China, Office Action Issued in Chinese Patent Application No. 201380041626.0, dated Oct. 10, 2015, 7 pages.
European Patent Office, Extended European Search Report Issued in Application No. 13828693.5, dated Oct. 16, 2015, Germany, 8 pages.
(Continued)

*Primary Examiner* — Quang Van
(74) *Attorney, Agent, or Firm* — Alleman Hall Creasman & Tuttle LLP

(57) ABSTRACT

For heating a mold efficiently and uniformly and for protecting an induction coil from corrosive gases, an upper plate that contacts an upper end face of a mold, and a lower plate that contacts a lower end face of the mold are provided, and an induction coil, provided to each plate, has a voltage applied by a commercial power supply. Each plate has a metal plate body in which a recessed housing portion that houses the induction coil is formed, and a cover that closes the recessed housing portion in a state where the induction coil is housed therein. A cover placement portion having a step that is greater than or equal to the thickness of the metal cover is formed in the metal plate body, and a plurality of jacket chambers in which a gas-liquid two phase heating medium is enclosed are formed in the metal plate body.

8 Claims, 16 Drawing Sheets

(51) Int. Cl.
 *H05B 6/10* (2006.01)
 *H05B 6/36* (2006.01)
 *H05B 6/44* (2006.01)
 *B29D 30/06* (2006.01)

(52) U.S. Cl.
 CPC ............... *H05B 6/108* (2013.01); *H05B 6/14* (2013.01); *H05B 6/36* (2013.01); *H05B 6/44* (2013.01); *B29D 2030/067* (2013.01); *B29D 2030/0674* (2013.01)

(58) Field of Classification Search
 CPC .......... B29D 30/0662; B29D 2030/067; B29D 2030/0674
 USPC ............... 219/618, 600, 620, 633, 642, 645; 426/241–247, 282, 660, 631, 512, 514, 426/515, 520, 524
 See application file for complete search history.

(56) References Cited

FOREIGN PATENT DOCUMENTS

| | | |
|---|---|---|
| GB | 890940 A | 3/1962 |
| JP | 61131388 A | 6/1986 |
| JP | 62225310 A | 10/1987 |
| JP | 2000326329 A | 11/2000 |
| JP | 2001158020 A | 6/2001 |
| JP | 2004026575 A | 1/2004 |
| JP | 2007290279 A | 11/2007 |
| JP | 2012025126 A | 2/2012 |
| JP | 5582906 B2 | 9/2014 |

OTHER PUBLICATIONS

ISA Japanese Patent Office, International Search Report Issued in Application No. PCT/JP2013/071212, dated Sep. 24, 2013, WIPO, 4 pages.

* cited by examiner

INDUCTION HEATING DEVICE FOR MOLD

TECHNICAL FIELD

The present invention relates to a mold induction heating device for heating a mold.

BACKGROUND ART

There are conventional methods of heating a molding object filled into a mold that involve raising the temperature of the mold to heat the molding object, by circulating steam through a steam flow path provided in the mold or by circulating steam through a steam flow path provided in a member brought into contact with the outer surface of the mold, as shown in Patent Document 1.

Methods that involve heating the mold using induction heating have also been considered in recent years from the viewpoint of shortening the heating time, achieving $CO_2$ reduction through using clean energy, and the like. Specifically, there are methods that involve arranging induction coils provided so as to surround the periphery of the mold, and passing magnetic flux that is produced by the induction coils into the mold so as to directly heat the mold with electrical heat (Joule heating) resulting from the induced current that is produced at this time, as shown in Patent Document 2 and Patent Document 3, for example.

However, there is a problem with methods that involve providing induction coils outside the mold and induction heating the mold directly in that it is difficult to efficiently pass magnetic flux that is produced by the coils into the mold, and magnetic flux that is produced by the induction coils leaks out without passing into the mold, preventing the mold from being adequately heated. Also, temperature unevenness tends to occur in the mold, preventing the molding item from being uniformly heated. Furthermore, the induction coils are corroded by corrosive gases that can exist outside the mold.

CITATION LIST

Patent Documents

Patent Document 1: JP 2007-290279A
Patent Document 2: JP 2000-326329A
Patent Document 3: JP 2004-026575A

SUMMARY OF THE INVENTION

Technical Problem

The present invention was made in order to collectively solve the above problems, and has a main stated object of heating a mold efficiently and uniformly, and protecting induction coils from corrosive gases.

Solution to Problem

A mold induction heating device according to the present invention is a mold induction heating device for induction heating a mold that forms a hollow portion therein, including an upper plate that contacts an upper end face of the mold, a lower plate that contacts a lower end face of the mold, and an induction coil that is provided to each plate, and has a voltage applied thereto by a 50 Hz or 60 Hz commercial power supply. Each of the plates has a metal plate body in which is formed a recessed housing portion for housing the induction coil, and a metal cover that closes the recessed housing portion in a state where the induction coil is housed therein. Also, a cover placement portion having a step that is greater than or equal to a thickness of the metal cover is formed around an entire edge of an opening of the recessed housing portion in the metal plate body, and a plurality of jacket chambers in which a gas-liquid two phase heating medium is enclosed are formed in the metal plate body.

According to such a configuration, magnetic flux that is produced by the induction coils can be efficiently passed into the plates by housing the induction coils in recessed housing portions, enabling the plates to be efficiently induction heated. The mold can then be efficiently heated given that the plates contact the upper end face and the lower end face of the mold.

Also, because a plurality of jacket chambers in which a gas-liquid two phase heating medium is enclosed are formed in each plate, the temperature of each plate can be equalized, enabling the mold to be uniformly heated as a result. Furthermore, because the recessed housing portions are closed and secured by metal covers, leakage of magnetic flux outside the plates can be further reduced without adversely affecting the pressure resistance of the plates, enabling the heating efficiency and power factor to be improved. Moreover, by fixing the metal covers to cover placement portions, the induction coils can be separated from the outside, enabling the prevention of corrosion of the induction coils by corrosive gases that can exist outside. In addition, because the cover placement portions have a step that is greater than the thickness of the metal cover, components, mechanisms and the like that are disposed on the outside of each plate do not need to be designed differently. Note that, since a magnetic circuit having a comparatively low magnetic reluctance is formed in the induction coil provided in each plate, the characteristics of a high power factor of 70% to 90% are exhibited even if a 50 Hz or 60 Hz commercial power supply is used as the power supply for applying a voltage to the induction coils. Also, because a commercial power supply can be used, power supply costs are kept down.

In the jacket chambers, the lower surface of a coil adjacent portion that is adjacent to the induction coil desirably has a portion that is lower than the lower surface of portions other than the coil adjacent portion. Because the lower surface of the coil adjacent portion that is adjacent to the induction coil in the jacket chambers has a portion that is lower than the lower surface of portions other than the coil adjacent portion, the liquid heating medium flows to the induction coil side, and gas-liquid circulation of the heating medium inside the jacket chambers is promoted, enabling the temperature to be more readily equalized.

In order to allow the liquid heating medium to flow to the induction coil side more efficiently, the jacket chambers desirably have a sloping surface that slopes such that the liquid heating medium flows to the induction coil side in the metal plate body.

In order to suppress heating of the metal cover as much as possible, the metal cover that closes each of the recessed housing portions is desirably divided into a plurality of portions or has a slit portion formed therein.

In order to improve the heating efficiency and power factor by forming a magnetic circuit having low magnetic reluctance, as well as reducing heating of the magnetic body installed in the coil center to prevent thermal damage to the coil, desirably the recessed housing portion formed in the upper plate or the lower plate is generally circular in plan view, the induction coil is generally ring-shaped, and a magnetic iron core that has undergone division or slit machining is provided in the space that is formed in the recessed housing portion by the induction coil in a state where the induction coil is housed in the recessed housing portion.

Also, the conventional approach to heating a ring-shaped molding object such as a tire with induction coils is usually to dispose the induction coils over the entire lateral surface constituting the entire area in the diameter direction in order to convey heat to the entire lateral surface.

However, with a ring-shaped molding object such as a tire, it was found that, when induction coils are disposed evenly in the diameter direction of the lateral surface portion, and the mold is heated with the induction coils from the position of the innermost ring in the diameter direction to the position of the outermost ring of the metal plate body in the diameter direction, only the area around the induction coils heats up locally, and it is not possible to heat the lateral surface or the entire molding object to a uniform temperature.

In view of this, an even temperature was achieved by disposing the induction coils in portions that are less than or equal to half the size of the metal plate body in a diameter direction from the position of the innermost ring of the metal plate body in the diameter direction, in the case where the recessed housing portion formed in the upper plate or the lower plate is generally circular in a plan view and the induction coils are generally ring-shaped. This is because, with a ring-shaped molding object such as a tire, using ring-shaped induction coils results in the heat diffusing radially outward in the diameter direction of the ring shape.

The heating efficiency and power factor can be improved by providing a short circuit part for conducting electricity made of a nonmagnetic metal inside the recessed housing portion.

The jacket chambers of the upper plate and the lower plate are desirably formed radially from a central portion of the metal plate body. This enables the temperature of the upper plate and the lower plate in the diameter direction to be equalized. Also, forming the jacket chambers radially from a central portion of each plate facilitates the machining of the jacket chambers.

At this time, the temperature of the upper plate and the lower plate in the circumferential direction can also be equalized by providing a communication passage that communicates between the jacket chambers.

In the jacket chambers, the lower surface of a coil adjacent portion that is adjacent to the induction coil desirably has a portion that is lower than the lower surface of portions other than the coil adjacent portion. This enables the liquid heating medium to flow to the induction coil side, and promotes gas-liquid circulation of the heating medium inside the jacket chambers, enabling the temperature to be more readily equalized.

In order to promote gas-liquid circulation of the heating medium inside the jacket chambers to allow the temperature to be more readily equalized, the jacket chambers are desirably provided in the metal plate body at an incline such that the liquid heating medium flows to the induction coil side.

In the case where the mold is for tire vulcanization, tires can be heated (vulcanized) uniformly because of being able to heat the mold uniformly, enabling high quality tires to be manufactured.

Advantageous Effects of the Invention

According to the present invention configured as described above, a mold can be heated efficiently and uniformly, and induction coils can be protected from corrosive gases.

DESCRIPTION OF REFERENCE NUMERALS

Figure 1:
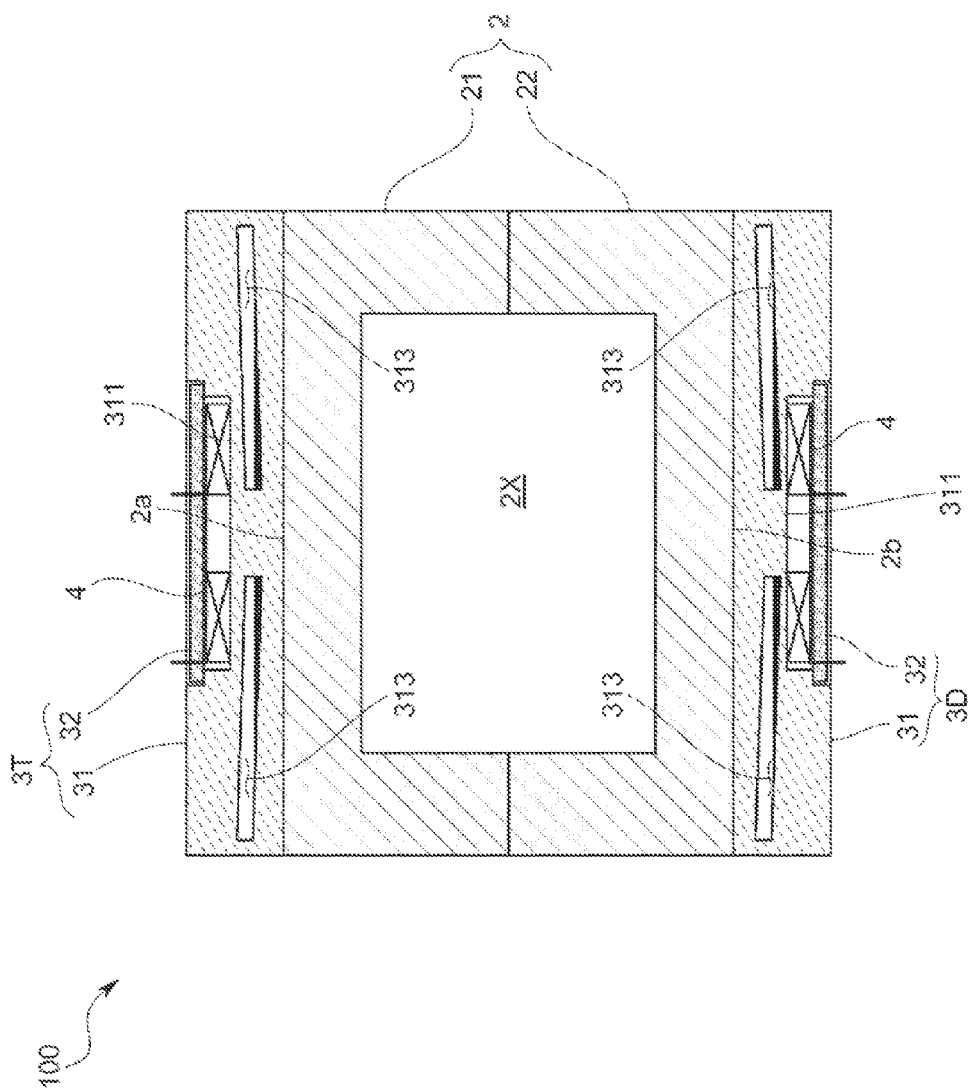
FIG. 1 is a schematic cross-sectional view of a metal induction heating device according to a first embodiment of the present invention.

100 Mold induction heating device
2 Mold
2X Hollow portion
2a Upper end face
2b Lower end face
2c Outer peripheral surface
3T Upper plate
3D Lower plate
31 Metal plate body
311 Recessed housing portion
312 Cover placement portion
313 Jacket chamber
32 Metal cover (cover)
321 Slit portion 4 Induction coil
5 Magnetic iron core
6 Short circuit part for conducting electricity

DESCRIPTION OF EMBODIMENTS

Hereinafter, a first embodiment of a mold induction heating device 100 according to the present invention will be described with reference to the drawings.

First Embodiment

The mold induction heating device 100 according to the present embodiment is used as a molding device that houses a processing object in a mold 2 consisting of a pair of an upper mold and a lower mold, and heats and molds the processing object.

Specifically, this device is for induction heating the mold 2, which has a generally rectangular parallelepiped shape and forms a hollow portion 2X for housing the processing object therein, as shown in FIG. 1, and includes an upper plate 3T that is generally rectangular in a plan view and contacts an upper end face 2a of the mold 2, a lower plate 3D that is generally rectangular in a plan view and contacts a lower end face 2b of the mold 2, and an induction coil 4 that is provided for each of the plates 3T and 3D and induction heats the plates 3T and 3D by supplying magnetic flux thereto when a voltage is applied by a 50 Hz or 60 Hz commercial power supply (not shown).

In the present embodiment, an upper mold 21 of the mold 2 is fixed to the upper plate 3T, and a lower mold 22 of the mold 2 is fixed to the lower plate 3D. Also, the device is configured such that the upper mold 21 is movable up and down relative to the lower mold 22, as a result of at least one of the upper plate 3T and the lower plate 3D being raised or lowered by a lift mechanism.

The upper plate 3T and the lower plate 3D each have a metal plate body 31 having a generally rectangular shape in a plan view and in which a recessed housing portion 311 for housing the induction coil 4 is formed, and a cover 32 that closes the recessed housing portion 311 in a state where the induction coil 4 is housed therein to form a closed magnetic circuit.

Figure 2:
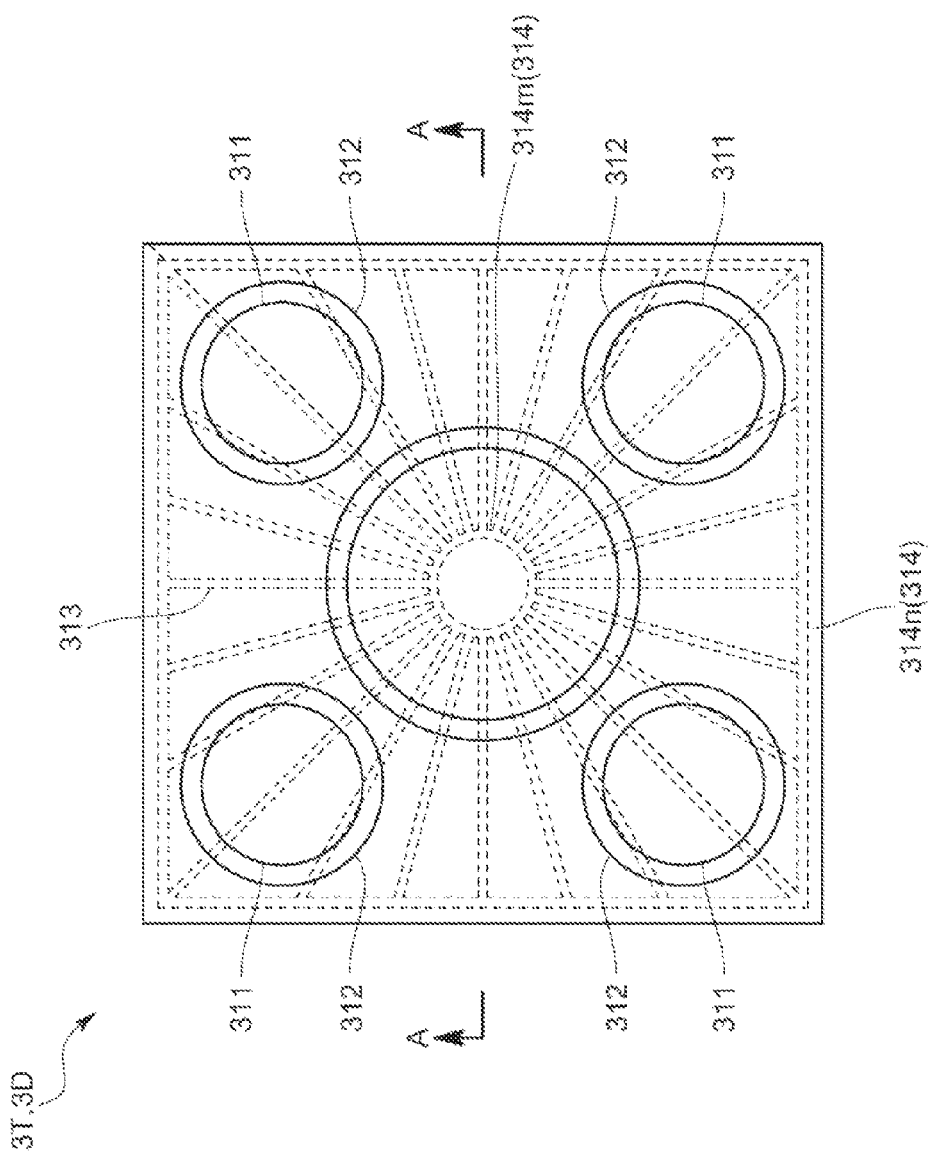
FIG. 2 is a plan view of an upper plate and a lower plate in the first embodiment.
Figure 3:
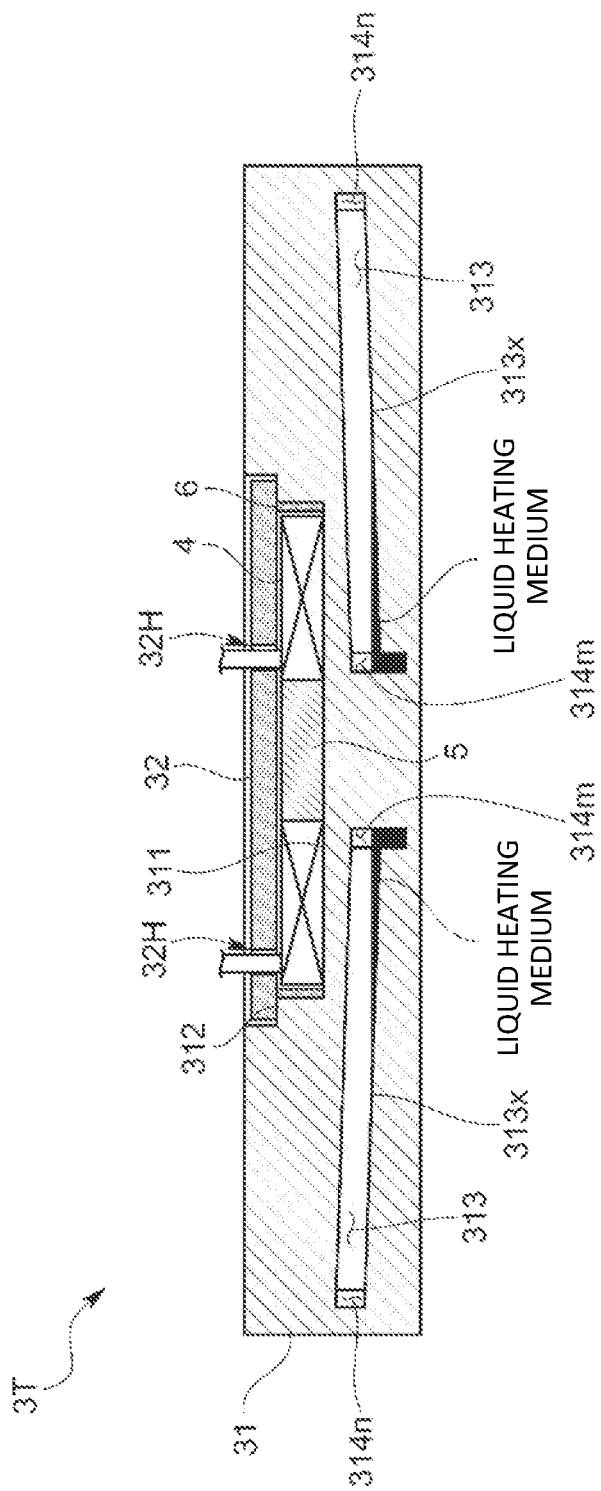
FIG. 3 is an A-A line cross-sectional view of the upper plate in the first embodiment.

In the metal plate body 31 of the upper plate 3T, a plurality of recessed housing portions 311 for housing the induction coils 4 are provided in the upper surface thereof horizontally and vertically symmetrically to the center in a plan view, as shown in FIG. 2. The present embodiment illustrates the case where one recessed housing portion 311 is formed in a central portion of the metal plate body 31, and four recessed housing portions 311 are formed therearound equidistantly in the circumferential direction. Each recessed housing portion 311 is generally circular in a plan view, and the depth thereof is greater than or equal to the thickness of the induction coils 4, as shown in FIG. 3. Note that the recessed housing portion 311 is not limited to being generally circular in a plan view, and may be formed in various shapes in a plan view, such as elliptical, polygonal or rod-like.

Figure 5:
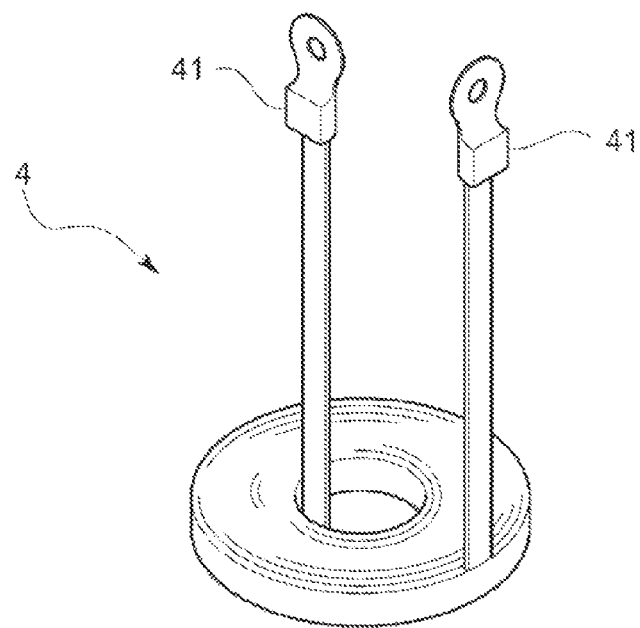
FIG. 5 is a perspective diagram of an induction coil in the first embodiment.

Here, the induction coils 4 housed in the recessed housing portions 311 of the upper plate 3T are formed by winding a band-like coil to be generally ring-shaped, and the outline shape thereof in a plan view is generally the same as the shape of the opening of the recessed housing portions 311, as shown in FIG. 5.

In the metal plate body 31 of the lower plate 3D recessed housing portions 311 for housing the induction coils 4 are provided in the lower surface thereof horizontally and vertically symmetrically to the center in a plan view, as shown in FIG. 2, similarly to the upper plate 3T. Each recessed housing portion 311 is generally circular in a plan view, and the depth thereof is greater than or equal to the thickness of the induction coils 4 (see FIG. 4), similarly to the recessed housing portions 311 formed in the upper plate 3T. Note that the configuration of the induction coils 4 that are housed in the recessed housing portions 311 of the lower plate 3D is similar to the induction coils 4 that are housed in the recessed housing portion 311 of the upper plate 3T described above.

Figure 4:
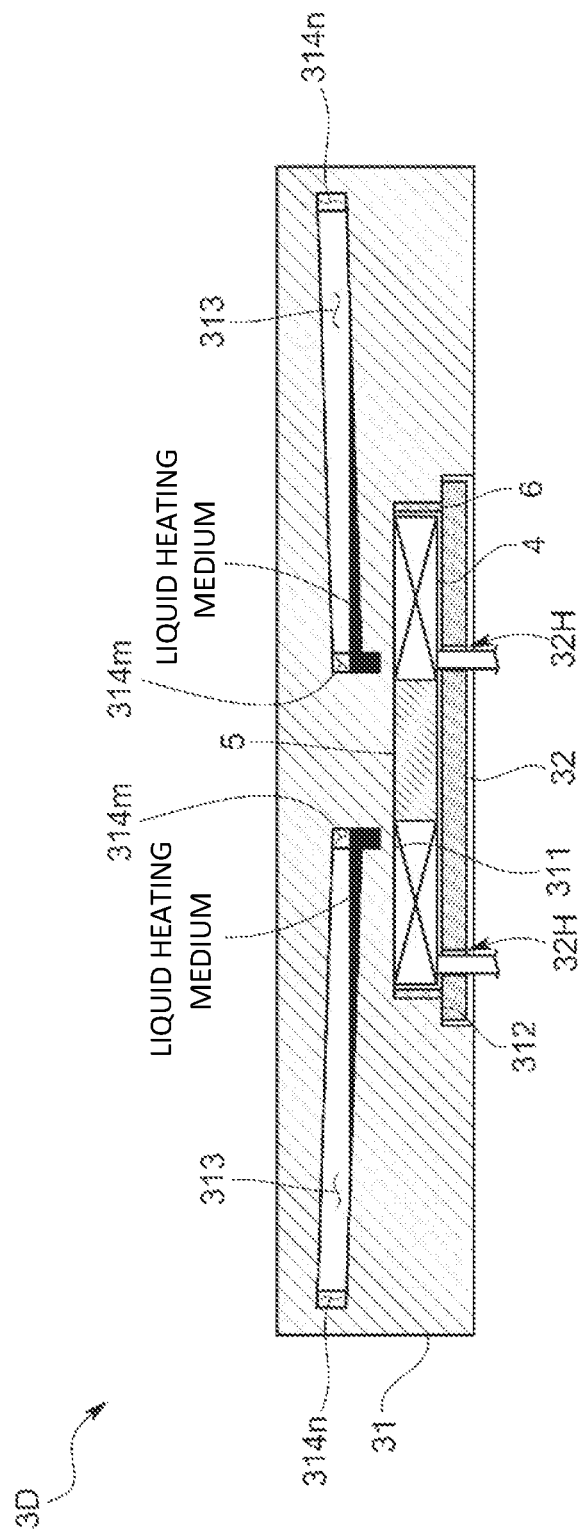
FIG. 4 is an A-A line cross-sectional view of the lower plate in the first embodiment.

Furthermore, as shown in FIG. 3 and FIG. 4, in the upper plate 3T and the lower plate 3D, a cover placement portion 312 having a step greater than or equal to the thickness of the metal cover 32 is formed around the entire edge of the opening of the recessed housing portion 311. The tabular cover 32 is screwed fixed to this cover placement portion 312. Note that, after having been screwed fixed, the abutting surfaces of the cover 32 and the cover placement portion 312 are in close contact.

Figure 6:
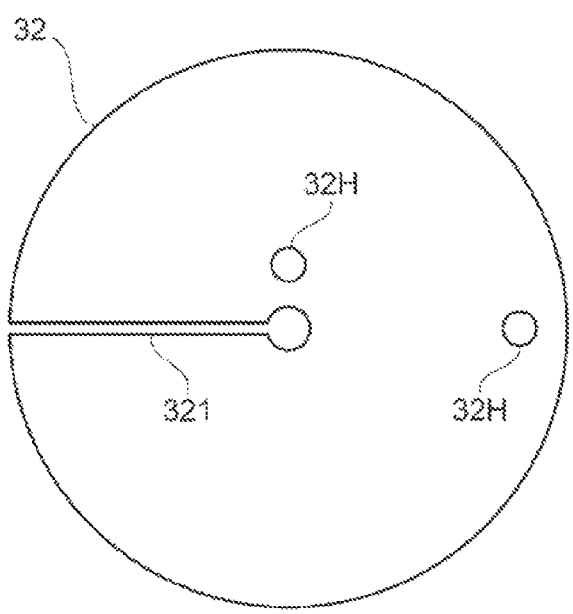
FIG. 6 is a plan view of a cover in the first embodiment.

As shown in FIG. 6, the cover 32 that closes the recessed housing portions 311 of the upper plate 3T and the lower plate 3D is a discoid having approximately the same shape in a plan view as the opening of the cover placement portion 312 formed in the recessed housing portion 311, and, in the present embodiment, is a metal plate that is generally discoid in a plan view. Also, as shown particularly in FIG. 6, an approximately straight slit portion 321 is formed in the cover 32 outwardly from the center in a diameter direction. This slit portion 321 enables induced current that is produced in the cover 32 to be suppressed, and heating of the actual cover 32 to be suppressed.

Furthermore, in addition to the slit portion 321, lead-out holes 32H are formed in the cover 32 in order to lead output terminals 41 that extend from the induction coil 4 housed in the recessed housing portion 311 to the outside (see FIG. 6). This cover 32 is fixed such that the upper surface of the cover placement portion 312 and the inner surface of the cover 32 are in close contact with each other, by fixing screws that are not shown. Note that (the outer lateral surface of) the cover 32 fixed to the cover placement portion 312 is located inwardly with respect to the surface of the upper plate 3T and the lower plate 3D in which the cover placement portion 312 is formed (see FIG. 3 and FIG. 4).

Specifically, the outer lateral surface of the cover 32 is located inwardly with respect to the upper surface of the metal plate body 31 in the case of the upper plate 3T, and the outer lateral surface of the cover 32 is located inwardly with respect to the lower surface of the metal plate body 31 in the case of the lower plate 3D. External mechanisms and components of the plates 3T and 3D thereby do not need to be modified.

Also, in the mold induction heating device 100 of the present embodiment, a magnetic iron core 5 that has undergone division or slit machining is provided in the hollow portion of the induction coils 4 housed in the recessed housing portions 311 of the upper plate 3T and the lower plate 3D, as is shown in FIG. 3 and FIG. 4. By thus providing the magnetic iron core 5, a magnetic circuit having low magnetic reluctance is formed within the hollow portion of the induction coils 4.

The magnetic iron core 5 of the present embodiment is cylindrically formed by stacking a plurality of magnetic steel plates so as to be shifted in the width direction. The magnetic steel plates have a rectangular plate shape, and include a curved portion having a curved cross-section in the width direction. These magnetic steel plates are formed using silicon steel sheets having an insulating membrane applied to the surface thereof, for example, and have a plate thickness of approximately 0.3 mm, for example. The curved portion conceivably curves at a constant curvature along an entirety thereof or curves at a continuously changing curvature, and conceivably has an involute shape that uses a portion of an involute curve, a partial arc shape, or a partial elliptical shape, for example.

Also, insulation processing is performed on both the upper and lower ends of the magnetic iron core 5 or an insulating material is provided on both the upper and lower ends of the magnetic iron core 5. The occurrence of a short-circuit current that flows to both the upper and lower ends of the magnetic iron core 5 can thereby be prevented.

Also, in the mold induction heating device 100 of the present embodiment, a short circuit part 6 for conducting electricity that is made of a nonmagnetic metal such as copper or stainless steel, for example, is provided on the inner surface of the recessed housing portion 311, that is, specifically, on the bottom surface and the inner peripheral surface of the recessed housing portion 311, as shown in FIG. 3 and FIG. 4. This short circuit part 6 for conducting electricity is formed using a copper sheet member, for example, and has a generally ring-shaped portion provided on the bottom surface of the recessed housing portion 311 to face the induction coil 4 and a generally cylindrical portion provided on the inner peripheral surface of the recessed housing portion 311 to face the outer peripheral surface of the induction coil 4. Note that the short circuit part 6 for conducting electricity may be configured by one of the generally ring-shaped portion and the generally cylindrical portion.

Furthermore, in the metal plate body 31 of each plate, a plurality of jacket chambers 313, in which a gas-liquid two phase heating medium is enclosed, are formed, and a communication passage 314 that communicates between the jacket chambers 313 is further formed.

The jacket chambers 313 are formed in the metal plate body 31 of the upper plate 3T to be closer to the lower surface side than is the recessed housing portion 311, as shown in FIG. 3, and are formed in the metal plate body 31 of the lower plate 3D to be closer to the upper surface side than is the recessed housing portion 311, as shown in FIG. 4.

Also, the jacket chambers 313 that are formed in the upper and lower plates 3T and 3D are provided substantially radially with respect to the center in a plan view, as shown in FIG. 2. The communication passage 314 of the present embodiment has a first communication passage 314m that communicates between inner end portions of adjacent jacket chambers 313, and a second communication passage 314n that communicates between outer end portions of adjacent jacket chambers 313.

In the plurality of jacket chambers 313 formed in the upper plate 3T and the lower plate 3D, the lower surface of a coil adjacent portion that is adjacent to the induction coil 4 has a portion that is lower than the lower surface of portions other than the coil adjacent portion, and the jacket chambers 313 have a sloping surface 313x that slopes such that the liquid heating medium flows to the induction coil 4 side in the metal plate body 31, that is, to a coil disposition portion of the metal plate body 31, as shown in FIG. 3 and FIG. 4. Specifically, the plurality of jacket chambers 313 have a sloping surface 313x that slopes such that the liquid heating medium flows to the side of the induction coil 4 provided in the recessed housing portion 311 that is in a central portion of the metal plate body 31. More specifically, the lower surface of each jacket chamber 313 has a sloping surface 313x that slopes down toward the side of the induction coil provided in the recessed housing portion 311 that is in a central portion of the metal plate body 31. The sloping surface 313x shown in FIG. 3 and FIG. 4 is configured such that the lower surface of the jacket chamber 313 serves as the sloping surface 313x by forming the actual jacket chamber 313 to slope inside the metal plate body 31. As a result of the sloping surface 313x, the liquid heating medium on the induction coil 4 side thus vaporizes and flows outside the jacket chamber 313 and into the second communication passage 314n to transmit heat to the outer side of the metal plate body 31. The heating medium liquefied by transmitting heat to the metal plate body 31 again flows along the sloping surface 313x to the induction coil 4 side.

Note that the jacket chamber 313 may also have the configuration of a second embodiment which will be discussed later (a configuration having a deep bottom 313p and a shallow bottom 313q discussed later).

With the mold induction heating device 100 according to the first embodiment constituted as described above, by housing the induction coils 4 in the recessed housing portions 311, magnetic flux that is produced by the induction coils 4 can be efficiently passed into the plates 3T and 3D, enabling the plates 3T and 3D to be efficiently induction heated. The mold 2 can then be efficiently heated, given that the plates 3T and 3D contact the upper end face 2a and the lower end face 2b of the mold 2.

Also, because a plurality of jacket chambers 313 are formed in each of the plates 3T and 3D, the temperature of the plates 3T and 3D can be equalized, enabling the mold 2 to be uniformly heated as a result. In particular, because the jacket chambers 313 have a sloping surface 313x that slopes such that the liquid heating medium flows to the induction coil 4 side, gas-liquid circulation of the heating medium inside the jacket chambers 313 is promoted, enabling the temperature to be more readily equalized.

Furthermore, because the recessed housing portions 311 are closed and secured by the cover 32, leakage of magnetic flux outside the plates 3T and 3D can be further reduced without adversely affecting the pressure resistance of the plates 3T and 3D, enabling the heating efficiency and power factor to be improved. Moreover, by fixing the cover 32 to the cover placement portion 312, the induction coil 4 can be separated from the outside, enabling the prevention of corrosion of the induction coil 4 by corrosive gases that can exist outside. In addition, because the cover placement portion 312 has a step that is greater than or equal to the thickness of the cover 32, components, mechanisms and the like that are disposed on the outside of the plates 3T and 3D do not need to be designed differently.

Second Embodiment

Hereinafter, a second embodiment of a mold induction heating device 100 according to the present invention will be described with reference to drawings.

The mold induction heating device 100 according to the present embodiment is used as a tire vulcanization molding device that houses a tire serving as a heating object in a mold 2 consisting of a pair of an upper mold and a lower mold, and heats and pressure molds the tire.

Figure 7:
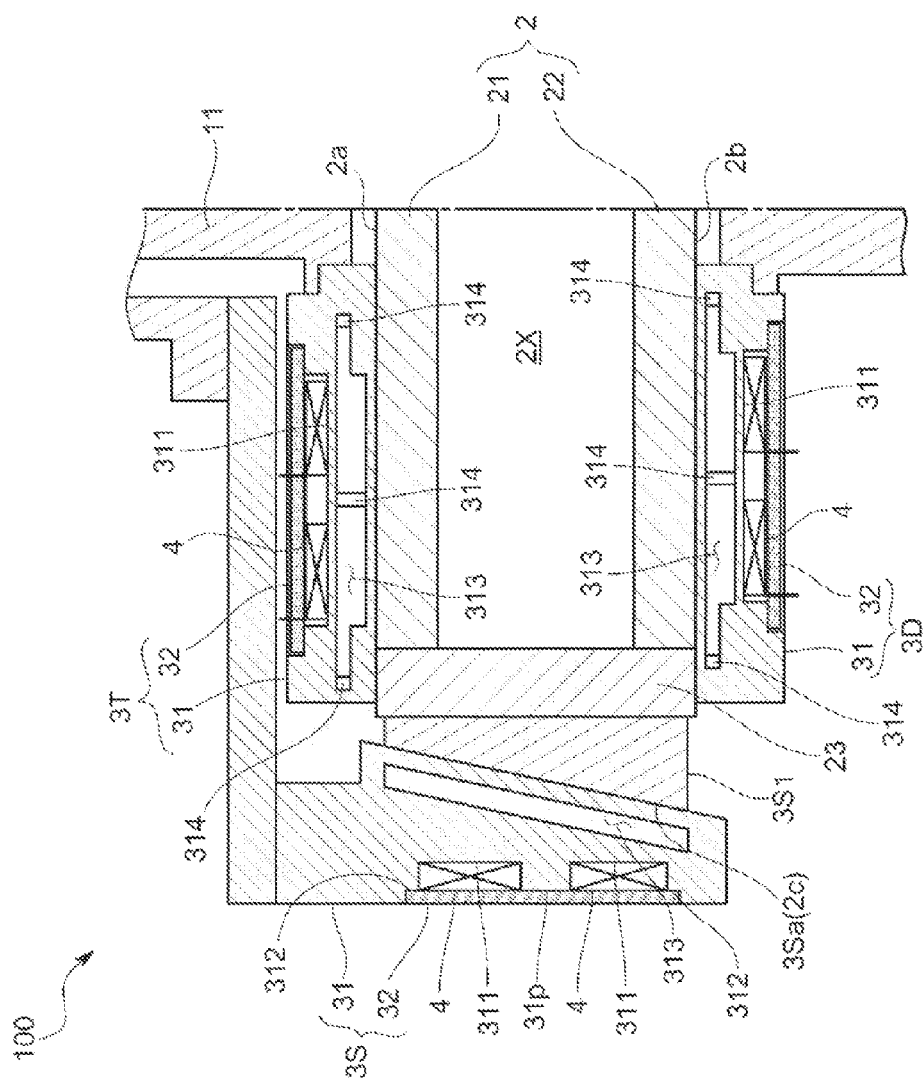
FIG. 7 is a schematic cross-sectional view of a mold induction heating device according to a second embodiment of the present invention.

Specifically, this device is for induction heating the tire vulcanization mold 2, which has a generally columnar shape and forms a hollow portion 2X for housing a tire therein, as shown in FIG. 7, and includes an upper plate 3T that is generally ring-shaped and contacts an upper end face 2a of the mold 2, a lower plate 3D that is generally ring-shaped and contacts a lower end face 2b of the mold 2, a side plate 3S that contacts an outer peripheral surface 2c of the mold 2, and an induction coil 4 that is provided for each of the plates 3T, 3D and 3S, and induction heats the plates 3T, 3D and 3S by supplying magnetic flux thereto when a voltage is applied by a 50 Hz or 60 Hz commercial power supply (not shown).

In the present embodiment, an upper mold 21 of the mold 2 is fixed to the upper plate 3T, a lower mold 22 of the mold 2 is fixed to the lower plate 3D, and a lateral mold 23 is fixed to a pressure piece 3S1 that is slidably attached to the side plate 3S. Also, the mold 2 is configured such that, as a result of at least the upper plate 3T being raised or lowered by a lift mechanism 11, the upper mold 21 moves up and down relative to the lower mold 22, and the lateral mold 23 fixed to the pressure piece 3S1 moves in and out via a sloping surface 3Sa of the pressure piece 3S1. Note that the lateral mold 23 is divided into a plurality of portions (e.g., 9 equal portions) in the circumferential direction, with these portions being disposed generally cylindrically, and the pressure piece 3S1 is provided in correspondence with each portion. Also, the pressure piece 3S1 is integrally formed with the lateral mold 23, and constitutes the lateral mold. At this time, the sloping surface 3Sa of the pressure piece 3S1 is the outer peripheral surface 2c of the lateral mold 23.

Figure 8:
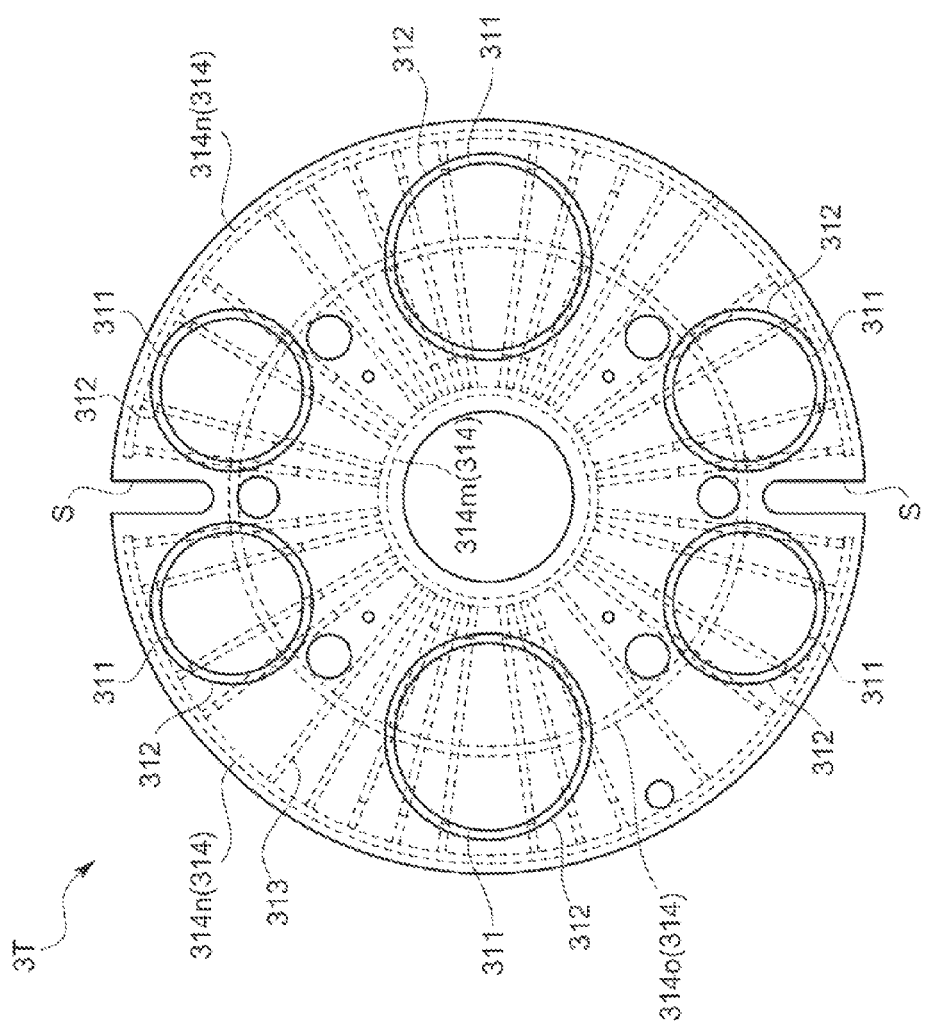
FIG. 8 is a plan view of an upper plate in the second embodiment.

The upper plate 3T has a generally discoid shape with an opening formed in a central portion thereof, and fixing slits S are formed inwardly from the outer periphery, as shown particularly in FIG. 8. Note that the lift mechanism 11 is connected to the opening (see FIG. 7).

Figure 9:
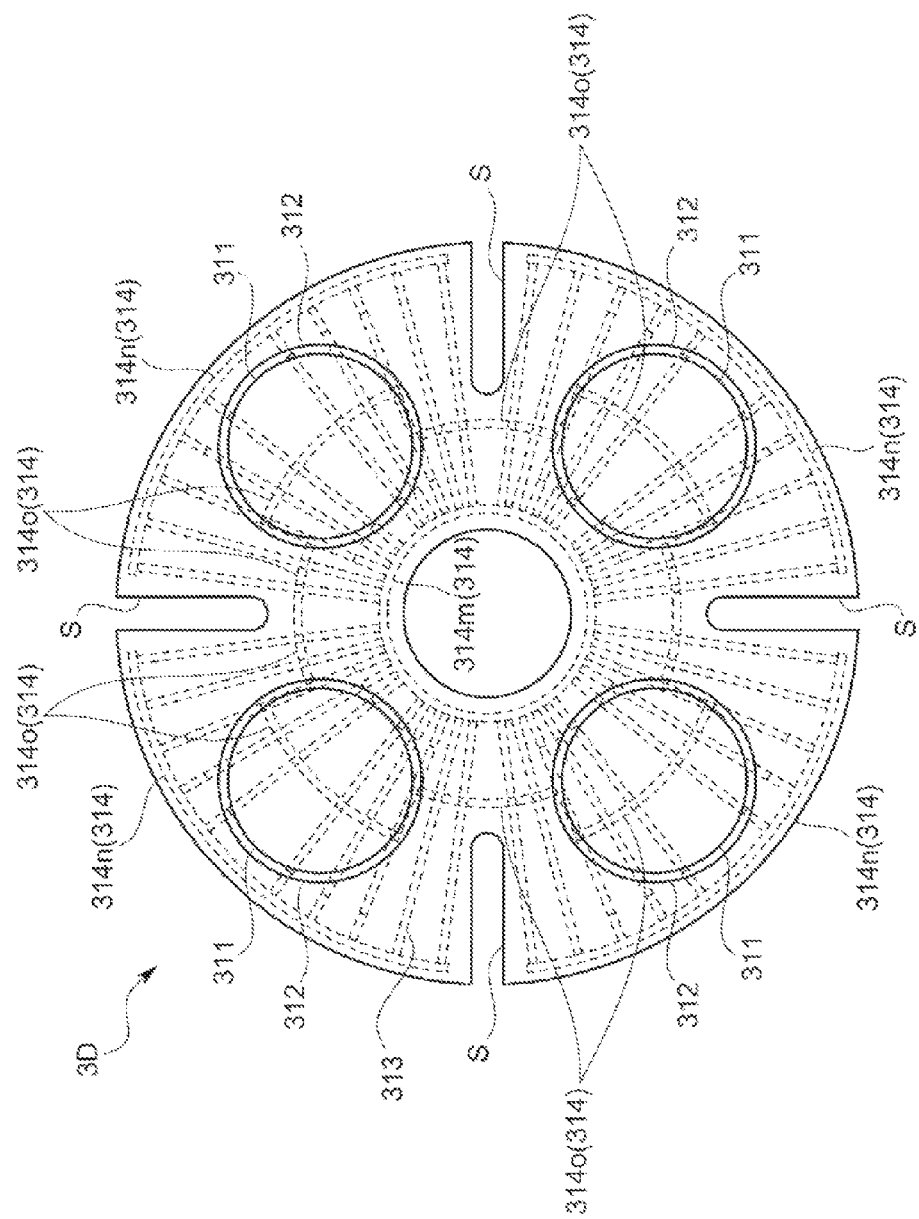
FIG. 9 is a plan view of a lower plate in the second embodiment.

The lower plate 3D, similarly to the upper plate 3T, has a generally discoid shape with an opening formed in a central portion thereof, and fixing slits S are formed inwardly from the outer periphery, as shown in FIG. 9. Note that a supporting mechanism or the like for supporting the lower plate 3D is attached to the opening, for example.

The side plate 3S, as shown in FIG. 7, has a generally cylindrical shape, and the slidable pressure piece 3S1 is provided on the inner surface thereof in the present embodiment.

The upper plate 3T, the lower plate 3D and the side plate 3S each have a generally ring-shaped metal plate body 31 in which a recessed housing portion 311 that houses the induction coil 4 is formed, and a metal cover 32 that closes the recessed housing portion 311 with the induction coil 4 housed therein, and forms a closed magnetic circuit.

Figure 10:
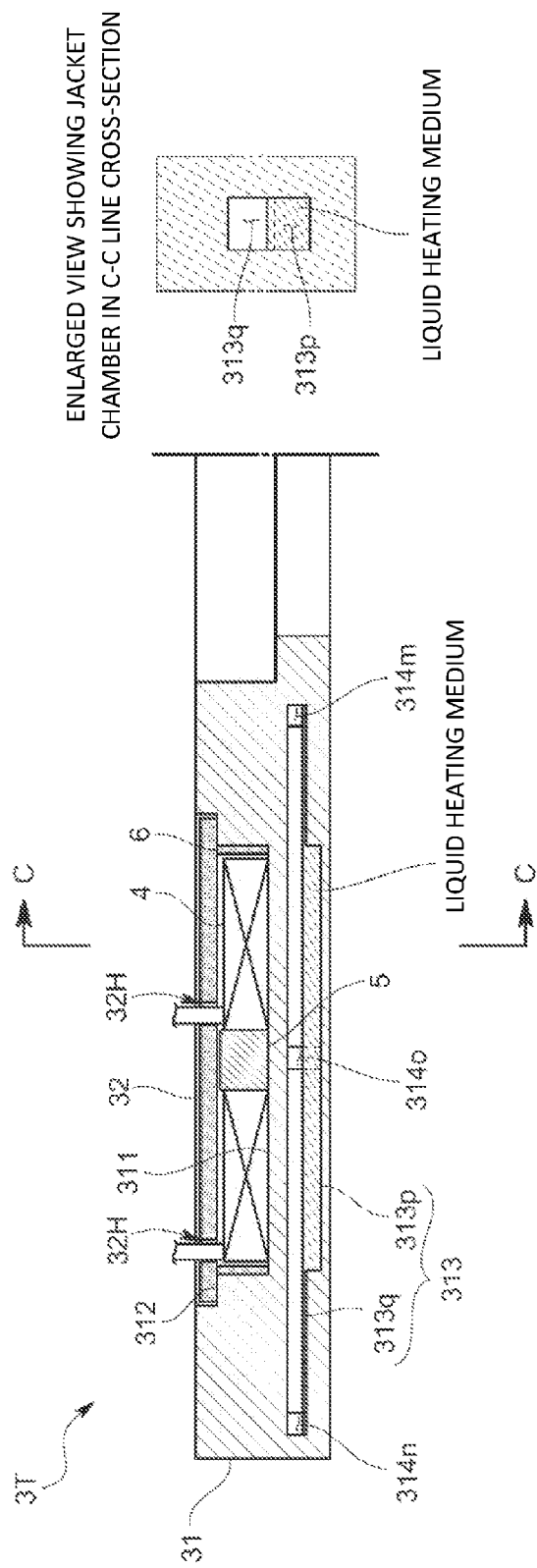
FIG. 10 is a schematic cross-sectional view of the upper plate in the second embodiment.

In the metal plate body 31 of the upper plate 3T, a plurality of recessed housing portions 311 for housing the induction coils 4 are provided in the upper surface thereof in a horizontally and vertically symmetrical arrangement to the center in a plan view, as shown in FIG. 8. Each recessed housing portion 311 is generally circular in a plan view, and the depth thereof is greater than or equal to the thickness of the induction coils 4, as shown in FIG. 10.

Figure 12:
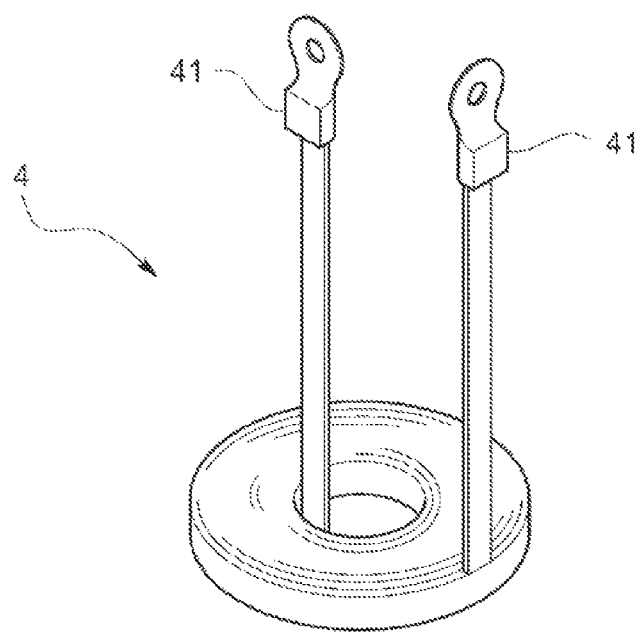
FIG. 12 is a perspective diagram of an induction coil in the second embodiment.

Here, the induction coils 4 housed in the recessed housing portions 311 of the upper plate 3T are formed by winding a band-like coil to be generally ring-shaped, and the outline shape thereof in a plan view is generally the same as the shape of the opening of the recessed housing portions 311, as shown in FIG. 12.

Also, the recessed housing portions 311 are provided in positions that avoid the holes, grooves, fixing slits S and the like provided in the upper plate 3T in order to attach other members or the like, that is, in positions that do not interfere with the holes, grooves, fixing slits S and the like (see FIG. 8). Note that the recessed housing portion 311 is not limited to being generally circular in a plan view, and may be formed in various shapes in a plan view, such as elliptical, polygonal or rod-like.

Figure 11:
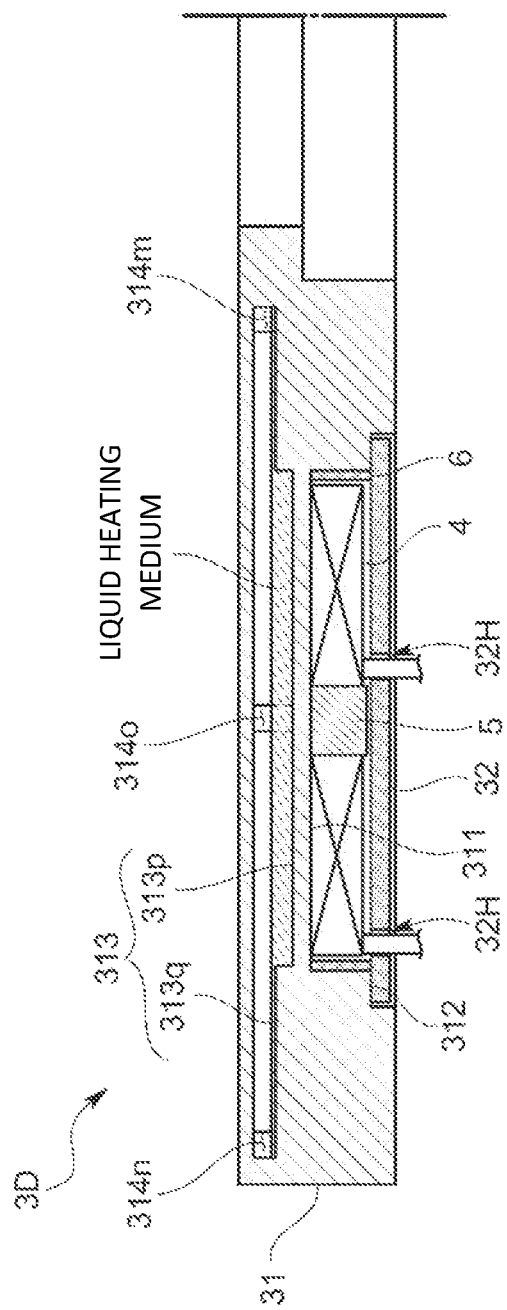
FIG. 11 is a schematic cross-sectional view of the lower plate in the second embodiment.

In the metal plate body 31 of the lower plate 3D, a plurality of recessed housing portions 311 for housing the induction coils 4 are provided in the lower surface thereof in a horizontally and vertically symmetrical arrangement to the center in a plan view, as shown in FIG. 9. Each recessed housing portion 311 is generally circular in a plan view, and the depth thereof is greater than or equal to the thickness of the induction coils 4, as shown in FIG. 11, similarly to the recessed housing portions 311 formed in the upper plate 3T. Note that the configuration of the induction coils 4 that are housed in the recessed housing portions 311 of the lower plate 3D is similar to the induction coils 4 that are housed in the recessed housing portion 311 of the upper plate 3T described above.

Also, the metal plate body 31 of the side plate 3S is provided such that the recessed housing portions 311, in which the induction coils 4 are housed by being wound around, extend around the outer peripheral surface thereof in the circumferential direction. In the present embodiment, two tiers (upper and lower) of recessed housing portions 311 are formed, but the present invention is not limited to two tiers, and there may be one or three or more tiers of recessed housing portions 311.

Furthermore, as shown in FIG. 10 and FIG. 11, in the upper plate 3T and the lower plate 3D, a cover placement portion 312 having a step that is greater than or equal to the thickness of the metal cover 32 is formed around the entire edge of the opening of the recessed housing portion 311. The tabular metal cover 32 is screwed and fixed to this cover placement portion 312. Note that, after having been screwed and fixed, the abutting surfaces of the metal cover 32 and the cover placement portion 312 are in close contact.

On the other hand, the side plate 3S is constituted such that the two tiers (upper and lower) of the recessed housing portions 311 are closed by a common metal cover 32, as shown in FIG. 7. In other words, a cover placement portion 312 is formed in the top opening edge of the upper recessed housing portion 311, and a cover placement portion 312 is formed in the bottom opening edge of the lower recessed housing portion 311. The peripheral end face of a partition wall 31p that partitions the upper recessed housing portion 311 and the lower recessed housing portion 311 also serves as a cover placement portion 312. A curved metal cover 32 is screwed and fixed to this cover placement portion 312. After having been screwed and fixed, the abutting surfaces of the metal cover 32 and the cover placement portion 312 are in close contact. Note that a configuration may be adopted in which the cover placement portion 312 is formed in correspondence with each tier, and each tier is closed by the metal cover 32.

Figure 13:
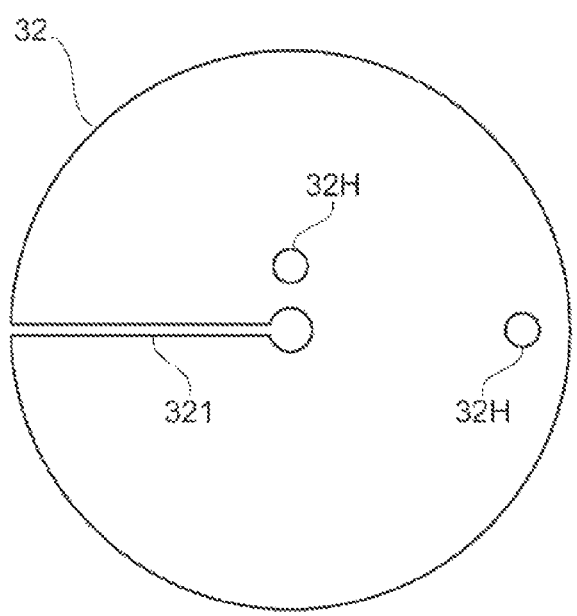
FIG. 13 is a plan view of a metal cover in the second embodiment.

As shown in FIG. 13, the metal cover 32 that closes the recessed housing portions 311 of the upper plate 3T and the lower plate 3D has a discoid shape that is approximately the same shape in a plan view as the opening of the cover placement portions 312 formed in the recessed housing portions 311, and, in the present embodiment, is a metal plate that is generally discoid in a plan view. Also, as shown particularly in FIG. 13, an approximately straight slit portion 321 is formed in the metal cover 32 outwardly from the center in the diameter direction. This slit portion 321 enables an induced current that occurs in the metal cover 32 to be suppressed, and heating of the actual metal cover 32 to be suppressed.

On the other hand, the metal cover 32 that closes the recessed housing portions 311 of the side plate 3S has a shape that fits into the cover placement portions 312 formed in the recessed housing portions 311, and, in the present embodiment, is a metal plate having a curved shape that curves with the same curvature as the cover placement portions 312. Also, this metal cover 32 is divided into a plurality of portions in the circumferential direction of the cover placement portions 312. By thus dividing the metal cover 32, induced current produced in the metal cover 32 can be suppressed, and the heating of the actual metal cover 32 can be suppressed.

Furthermore, in addition to the slit portion 321, lead-out holes 32H are formed in the metal cover 32 in order to lead output terminals 41 that extend from the induction coils 4 housed in the recessed housing portions 311 to the outside (see FIG. 13). This metal cover 32 is fixed by fixing screws that are not illustrated, such that the upper surface of the cover placement portions 312 and the inner lateral surface of the metal cover 32 are in close contact. Note that (the outer lateral surface of) the metal cover 32 fixed to the cover placement portions 312 is located inwardly with respect to the surfaces of the upper plate 3T, the lower plate 3D and the side plate 3S in which the cover placement portions 312 are formed.

Specifically, the outer lateral surface of the metal cover 32 is located inwardly with respect to the upper surface of the metal plate body 31 in the case of the upper plate 3T, the outer lateral surface of the metal cover 32 is located inwardly with respect to the lower surface of the metal plate body 31 in the case of the lower plate 3D, and the outer lateral surface of the metal cover 32 is located inwardly with respect to the outer peripheral surface of the metal plate body 31 in the case of the side plate 3S. External mechanisms and components of the plates 3T, 3D and 3S thereby do not need to be modified.

Also, in the mold induction heating device 100 of the present embodiment, a magnetic iron core 5 that has undergone division or slit machining is provided in the hollow portion of the induction coils 4 housed in the recessed housing portions 311 of the upper plate 3T and the lower plate 3D, as is shown in FIG. 10 and FIG. 11. By thus providing the magnetic iron core 5, a magnetic circuit having low magnetic reluctance is formed within the hollow portion of the induction coils 4.

The magnetic iron core 5 of the present embodiment is cylindrically formed by stacking a plurality of magnetic steel plates to be shifted in the width direction. The magnetic steel plates have a rectangular plate shape, and include a curved portion having a curved cross-section in the width direction. These magnetic steel plates are formed using silicon steel sheets having an insulating membrane applied to the surface thereof, for example, and have a plate thickness of approximately 0.3 mm, for example. The curved portion conceivably curves at a constant curvature along an entirety thereof or curves at a continuously changing curvature, and conceivably has an involute shape that uses a portion of an involute curve, a partial arc shape, or a partial elliptical shape, for example.

Also, insulation processing is performed on both the upper and lower ends of the magnetic iron core 5 or an insulating material is provided on both the upper and lower ends of the magnetic iron core 5. The occurrence of a short-circuit current that flows to both the upper and lower ends of the magnetic iron core 5 can thereby be prevented.

Also, in the mold induction heating device 100 of the present embodiment, a short circuit part 6 for conducting electricity that is made of a nonmagnetic metal such as copper or stainless steel, for example, is provided on the inner surface of the recessed housing portion 311, that is, specifically, on the inner peripheral surface, as shown in FIG. 10 and FIG. 11. This short circuit part 6 for conducting electricity is formed using a copper sheet member, for example, and is provided so as to cover approximately the entire inner peripheral surface of the recessed housing portion 311. Note that, while cross-sectional views of the upper plate 3T and the lower plate 3D are shown in FIG. 10 and FIG. 11, a short circuit part 6 for conducting electricity may be provided on the inner surface of the recessed housing portions 311 of the side plate 3S.

Furthermore, in the metal plate body 31 of each plate, a plurality of jacket chambers 313 in which a gas-liquid two phase heating medium is enclosed are formed, and a communication passage 314 that communicates between the jacket chambers 313 is further formed.

The jacket chambers 313 are formed in the metal plate body 31 of the upper plate 3T to be closer to the lower surface side than is the recessed housing portion 311, and are formed in the metal plate body 31 of the lower plate 3D to be closer to the upper surface side than is the recessed housing portion 311, as shown in FIG. 7. Also, the jacket chamber 313 is formed in the metal plate body 31 of the side plate 3S so as to be closer to the center side (inside surface side) than is the recessed housing portion 311.

Also, as shown in FIG. 8 and FIG. 9, the jacket chamber 313 formed in the upper and lower plates 3D are provided so as to be substantially horizontally and vertically symmetrical to the center in a plan view, so as to avoid the fixing slit S formed in the upper and lower plates 3D. The communication passage 314 of the present embodiment has a first communication passage 314*m* that communicates between inner end portions of adjacent jacket chambers 313 in the diameter direction, and a second communication passage 314*n* that communicates between outer end portions of adjacent jacket chambers 313 in the diameter direction.

In the plurality of jacket chambers 313 formed in the upper plate 3T and the lower plate 3D, the lower surface of a coil adjacent portion that is adjacent to the induction coil 4 has a portion that is lower than the lower surface of portions other than the coil adjacent portion, and the jacket chambers 313 have a deep bottom portion 313*p* formed such that the liquid heating medium collects on the induction coil 4 side, that is, in a coil disposition portion of the metal plate body 31, as shown in FIG. 10 and FIG. 11. This deep bottom portion 313*p* is formed to span approximately the entirety of the coil adjacent portion that is adjacent to the induction coil 4 at the jacket chamber 313 (portion overlapping with the coil disposition portion of the metal plate body 31 in a plan view), and portions of the jacket chamber 313 other than the coil adjacent portion are shallow bottom portions 313*q*. The heating medium is enclosed in this jacket chamber 313 such that the liquid surface of the liquid heating medium is located not only in the deep bottom portion 313*p*, but also in the shallow bottom portion 313*q*.

Note that the first communication passage 314*m* and the second communication passage 314*n* communicate between the shallow bottom portions 313*q* of the jacket chambers 313. Also, the communication passage 314 has a third communication passage 314*o* that communicates between the deep bottom portions 313*p* of adjacent jacket chambers 313 (see FIGS. 8 to 11).

By thus providing the jacket chambers 313 and communication passage 314, the temperature of the upper plate 3T and the lower plate 3D in the diameter direction can be equalized. Also, because the jacket chambers 313 are in communication via the communication passage 314, the temperature of the upper plate 3T and the lower plate 3D in the circumferential direction can also be equalized. Furthermore, because the jacket chambers 313 are formed radially from the central portion of the upper plate 3T and the lower plate 3D, machining of the jacket chambers 313 can be facilitated. In particular, because the jacket chambers 313 have the deep bottom portion 313p in the coil adjacent portion, the liquid heating medium can be made to flow to the induction coil 4 side, and gas-liquid circulation of the heating medium inside the jacket chamber 313 is promoted, enabling the temperature to be more readily equalized.

Furthermore, a commercial power supply having a commercial power supply frequency (50 Hz or 60 Hz) is used as the power supply for applying a voltage to the induction coils 4. Since a magnetic circuit having comparatively low magnetic reluctance is formed in the induction coil 4 by providing the induction coil 4 in the recessed housing portion 311, the characteristics of a high power factor of 70% to 90% are exhibited even in the case where a commercial power supply is used. Also, because a commercial power supply can be used, power supply costs can be kept down.

With the mold induction heating device 100 according to the second embodiment constituted as described above, by housing the induction coils 4 in the recessed housing portions 311, magnetic flux that is produced by the induction coils 4 can be efficiently passed into the plates 3T, 3D and 3S, enabling the plates 3T, 3D and 3S to be efficiently induction heated. Also, the generally columnar mold 2 can be efficiently heated, given that the plates 3T, 3D and 3S respectively contact the upper end face 2a, the lower end face 2b and the lateral face 2c of the mold 2.

Also, because a plurality of jacket chambers 313, in which a gas-liquid two phase heating medium is enclosed, are formed in each of the plates 3T, 3D and 3S, the temperature of the plates 3T, 3D and 3S can be equalized, enabling the mold 2 to be uniformly heated as a result. It thereby becomes possible to uniformly heat (vulcanize) tires, enabling high quality tires to be manufactured. In particular, because the jacket chamber 313 has the deep bottom portion 313p in the coil adjacent portion, the liquid heating medium can be caused to flow to the induction coil 4 side, and gas-liquid circulation of the heating medium inside the jacket chambers 313 can be promoted, enabling the temperature to be more readily equalized.

Furthermore, because the recessed housing portions 311 are closed and secured by the metal cover 32, leakage of magnetic flux outside the plates 3T, 3D and 3S can be further reduced without adversely affecting the pressure resistance of the plates 3T, 3D and 3S, enabling the heating efficiency and power factor to be improved.

Moreover, by fixing the metal cover 32 to the cover placement portion 312, the induction coil 4 can be separated from the outside, enabling the prevention of corrosion of the induction coil 4 by corrosive gases (e.g., sulfurous acid gas) that can exist outside.

In addition, because the cover placement portion 312 has a step that is greater than or equal to the thickness of the metal cover 32, components, mechanisms and the like that are disposed on the outside of the plates 3T, 3D and 3S do not need to be designed differently.

Note that the present invention is not limited to the above embodiments.

For example, although, in the above embodiments, a slit portion is formed in the metal cover that is fixed to the upper and lower plates, the metal cover may be divided into a plurality of portions.

Also, although the magnetic iron core of the above embodiments is cylindrically formed by stacking a plurality of magnetic steel plates to be shifted in the width direction, an iron core or the like having a generally cylindrical shape and a slit portion formed in the lateral wall may alternatively be used.

Furthermore, apart from being generally circular, the recessed housing portion that is formed in the upper and lower plates may be generally ring-shaped. Also, the recessed housing portions that are formed in the side plate are grooves that extend around in the circumferential direction, but may be recessed portions that are generally circular, similarly to the upper and lower plates.

Figure 14:
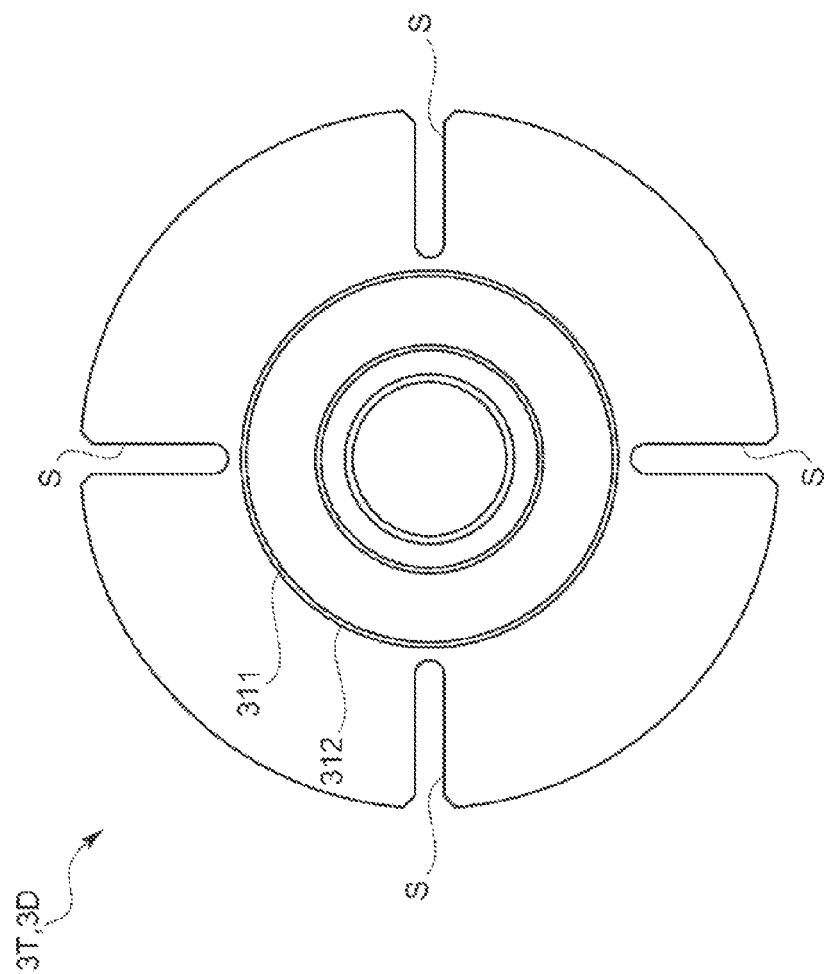
FIG. 14 is a plan view of an upper plate according to a modified embodiment.

As a mode for forming the recessed housing portion 311 to be generally circular, it is conceivable to form the recessed housing portion 311 more inwardly than the fixing slits S, concentrically surrounding the opening as shown in the plan view of FIG. 14. At this time, the induction coil that is housed in this recessed housing portion 311 and the metal cover 32 have generally the same shape in a plan view as the opening of the recessed housing portion 311. Note that, in FIG. 15, a bottom view (FIG. 15(A)) and a right lateral view (FIG. 15(B)) of the heating plate (upper plate or lower plate) of FIG. 14 are shown. In this bottom view, the jacket chamber 313 and communication passage 314 that are formed therein are shown with dotted lines.

Also, in the configuration of FIG. 14, the induction coil 4 is desirably disposed in a portion that is less than or equal to half the size of the metal plate body 31 in the diameter direction from the position of the innermost ring of the metal plate body 31 in the diameter direction. In other words, the induction coil 4 is desirably disposed inwardly with respect to an intermediate position in the diameter direction between the position of the innermost ring of the metal plate body 31 in the diameter direction and the position of the outermost ring in the diameter direction. By disposing the induction coil 4 in this way, heat diffuses radially outward in the diameter direction as a result of the ring-shaped induction coil 4, enabling the plates 3T and 3D to be efficiently and uniformly induction heated. Furthermore, temperature dispersion over the entire lateral surface of a ring-shaped molding object such as a tire can be achieved more uniformly by using the jacket chambers 313 and the communication passage 314 to facilitate the diffusion of heat.

Here, in the case where the induction coils were disposed evenly in the radial direction of the lateral surface portion and the mold was heated with the induction coils from the position of the innermost ring of the metal plate body 31 in the diameter direction to the position of the outermost ring of the metal plate body 31 in the radial direction, the temperature difference between high temperature portions and low temperature portions was 200 degrees or more. In contrast, in the case where the induction coils 4 were disposed in portions that are less than or equal to half the size of the metal plate body 31 in the diameter direction from the position of the innermost ring of the metal plate body 31 in the diameter direction or a vicinity thereof, it was possible to reduce the temperature difference between the high temperature portions and low temperature portions to 10 degrees or less. Note that, even in the case where the induction coils 4 were disposed in portions that are less than or equal to one third of the size of the metal plate body 31 in the diameter direction from the position of the innermost ring of the metal plate body 31 in the diameter direction, it was possible to achieve sufficient temperature equalization.

Figure 15:
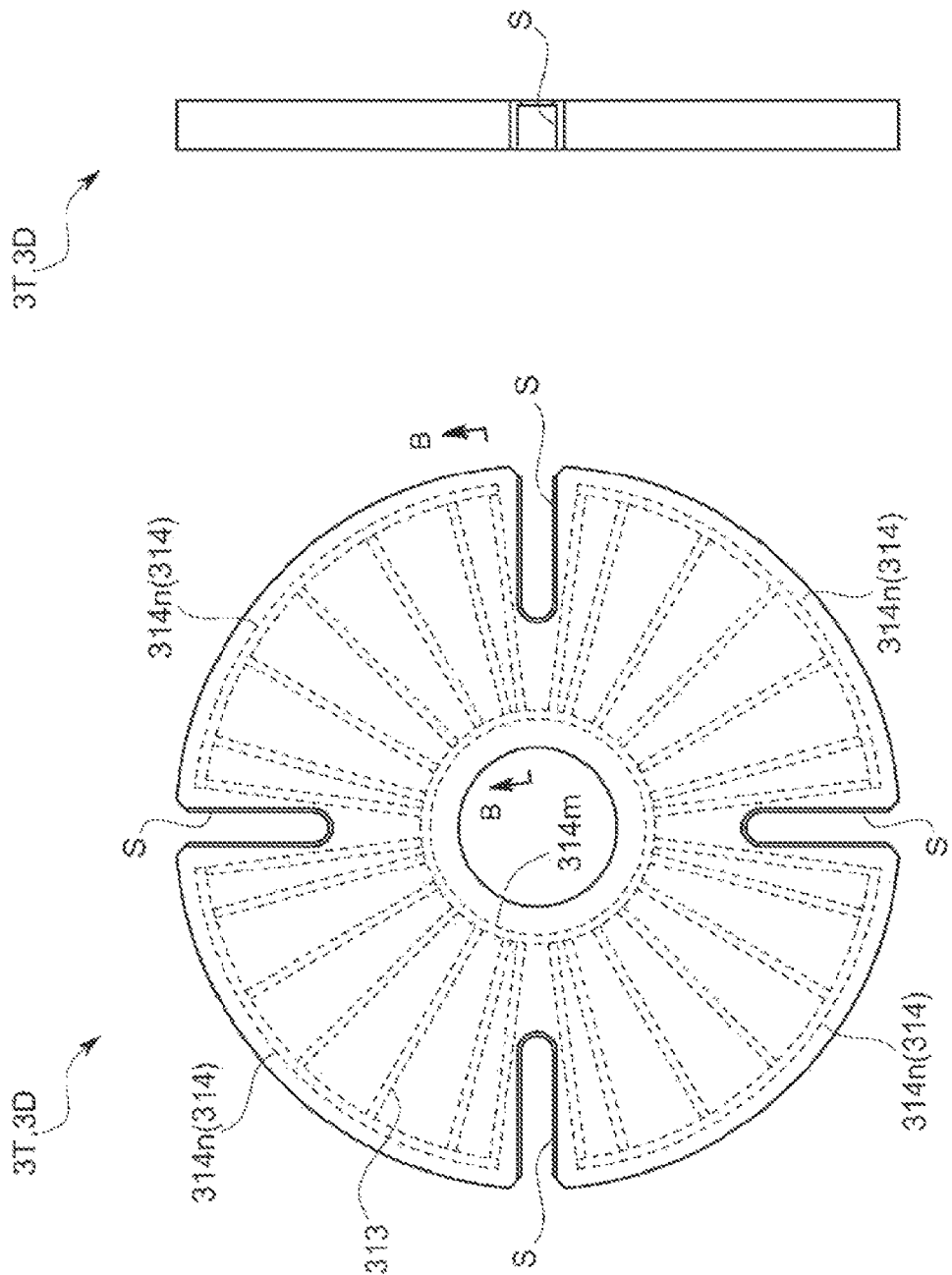
FIGS. 15A and 15B are a bottom view and a right side view of the upper plate (or lower plate) according to the modified embodiment.
Figure 16:
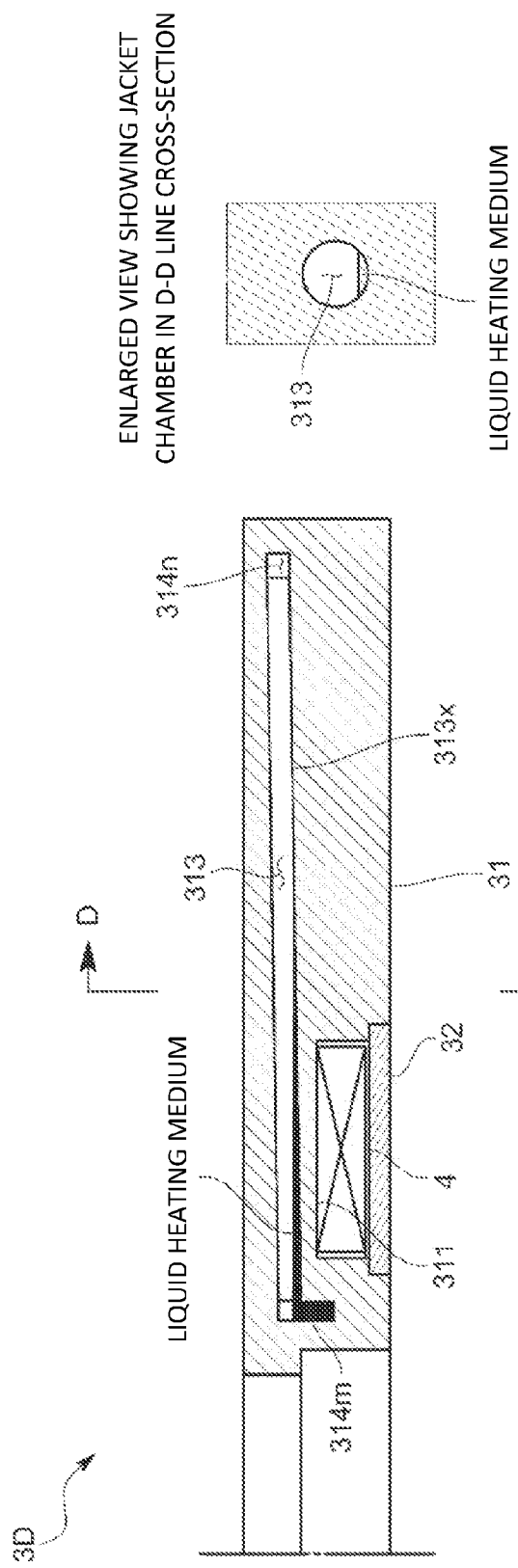
FIG. 16 is a partially enlarged cross-sectional view of the modified embodiment along the B-B line.
Figure 17:
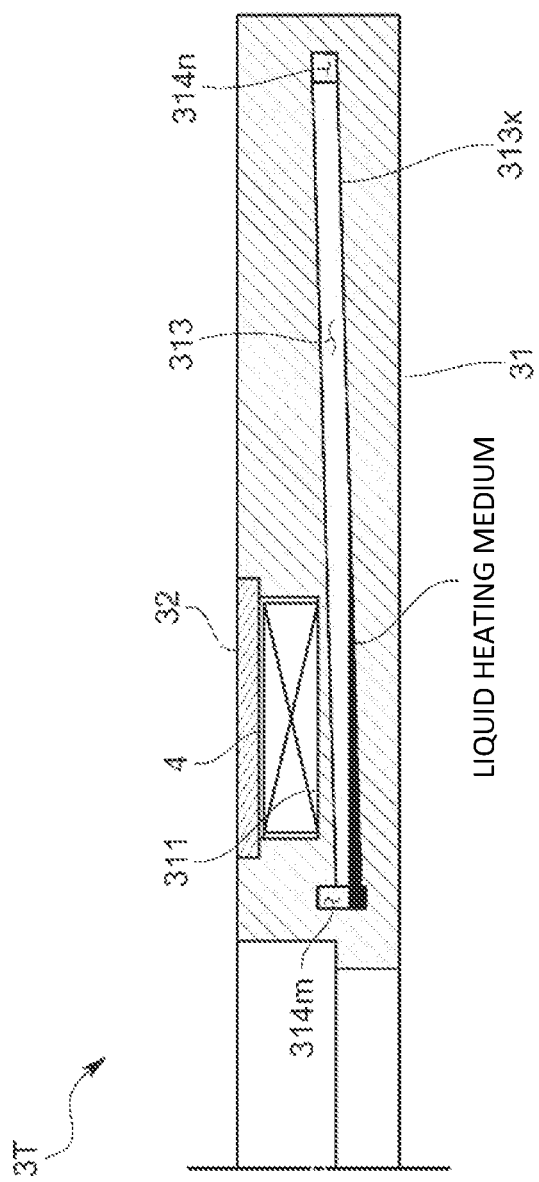
FIG. 17 is an enlarged cross-sectional view showing the configuration of a jacket chamber of the upper plate according to a modified embodiment.

Moreover, although, in the above embodiments, the jacket chambers 313 formed in the upper plate 3T and the lower plate 3D are configured to have a deep bottom portion 313p and a shallow bottom portion 313q such that the lower surface of a coil adjacent portion that is adjacent to the induction coil 4 has a portion that is lower than the lower surface of portions other than the coil adjacent portion, the jacket chambers 313 may have a sloping surface 313x that slopes such that the liquid heating medium flows to the induction coil side in the metal plate body 31, or in other words, to the coil disposition portion of the metal plate body 31. An enlarged cross-sectional view of the heating plate along the B-B line in FIG. 15 is shown in FIG. 16. As shown in FIG. 16, the jacket chamber 313 is formed so as to gradually slope toward the induction coil 4 side from the outer side of the metal plate body 31 in the diameter direction toward the inner side in the diameter direction. Note that although the configuration in the case of the lower plate 3D is shown in FIG. 16, in the case of the upper plate 3T, as shown in FIG. 17, the jacket chamber 313 is formed at an incline so as to gradually slope away from the induction coil 4 from the outer side of the metal plate body 31 in the diameter direction to the inner side in the diameter direction. By adopting such a configuration, gas-liquid circulation of the heating medium inside the jacket chamber 313 is promoted, enabling the temperature to be more readily equalized, and tires can be vulcanized with greater accuracy, enabling high quality tires to be manufactured.

Figure 18:
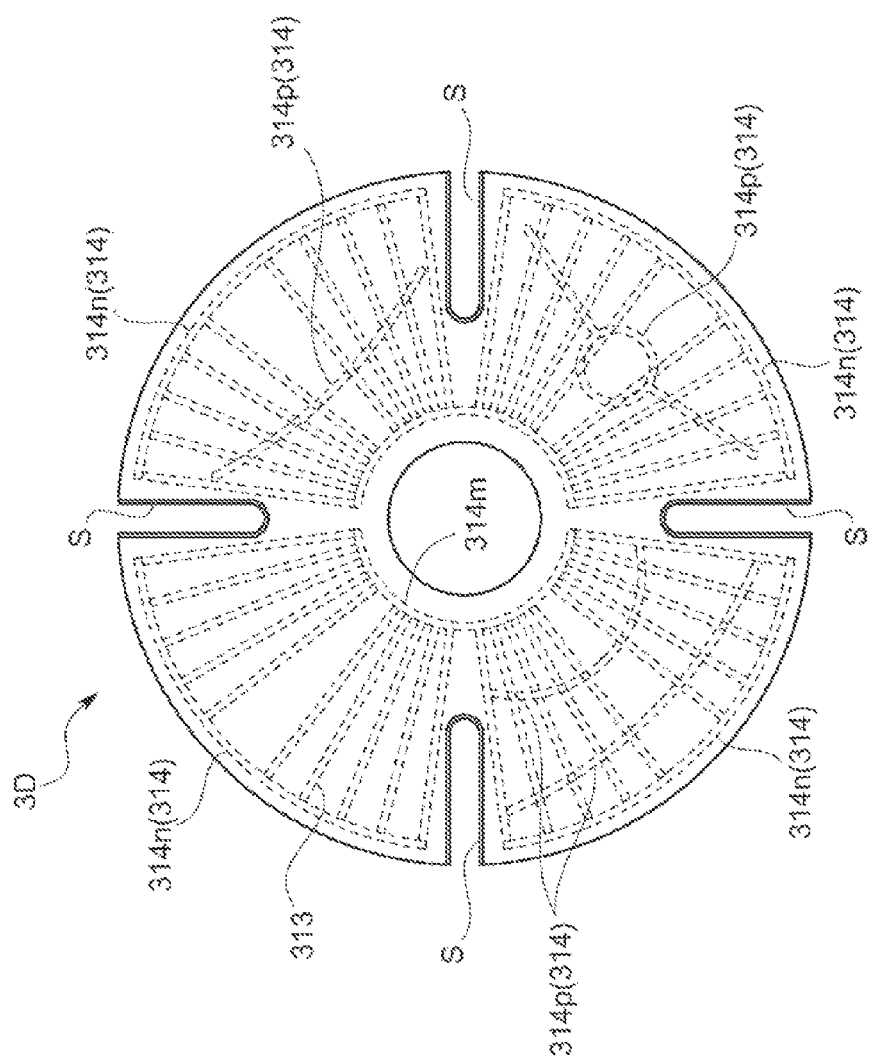
FIG. 18 is a plan view of an upper plate according to another modified embodiment.

Additionally, apart from the first communication passage 314m that communicates between the inner end portions of adjacent jacket chambers 313 in the diameter direction and the second communication passage 314n that communicates between the outer end portions of adjacent jacket chambers 313 in the diameter direction, a fourth communication passage 314p may be provided that communicates between the plurality of jacket chambers 313, in the vicinity of the induction coils 4, as shown in FIG. 18.

It should be understood that the present invention is not limited to the above embodiments, and that various modifications and combinations of the embodiments that do not depart from the gist of the invention are possible.

INDUSTRIAL APPLICABILITY

Application of the present invention enables a mold to be efficiently and uniformly heated, and induction coils to be protected from corrosive gases.

The invention claimed is:

1. A mold induction heating device for induction heating a mold that forms a hollow portion therein, comprising:
an upper plate that contacts an upper end face of the mold;
a lower plate that contacts a lower end face of the mold; and
an induction coil that is provided to each plate, and has a voltage applied thereto,
wherein each of the plates has a generally ring-shaped metal plate body in which is formed a recessed housing portion for housing the induction coil, and a metal cover that closes the recessed housing portion in a state where the induction coil is housed therein,
a cover placement portion is formed, and
a plurality of jacket chambers, in which a gas-liquid two phase heating medium is enclosed, are formed in the metal plate body,
wherein in the jacket chambers, a lower surface of a coil adjacent portion that is adjacent to the induction coil has a portion that is lower than a lower surface of portions other than the coil adjacent portion, and
the coil adjacent portions of the jacket chambers adjacent to each other are in communication with each other by a communication passage.

2. The mold induction heating device according to claim 1,
wherein the jacket chambers are provided in the metal plate body at an incline such that a liquid heating medium flows to the induction coil side.

3. The mold induction heating device according to claim 1,
wherein the metal cover that closes each of the recessed housing portions is divided into a plurality of portions or has a slit portion formed therein.

4. The mold induction heating device according to claim 1,
wherein the recessed housing portion formed in the upper plate or the lower plate is generally circular in a plan view,
the induction coil is generally ring-shaped, and
a magnetic iron core that has undergone division or slit machining is provided in a space that is formed in the recessed housing portion by a central portion of the induction coil in a state where the induction coil is housed in the recessed housing portion.

5. The mold induction heating device according to claim 1,
wherein the recessed housing portion formed in the upper plate or the lower plate is generally circular in a plan view, and
the induction coil is generally ring-shaped, and is disposed in a portion that is less than or equal to half of a size of the metal plate body in a diameter direction from a position of an innermost ring of the metal plate body in the diameter direction or a vicinity thereof.

6. The mold induction heating device according to claim 1,
wherein a short circuit part for conducting electricity and made of a nonmagnetic metal is provided on an inner surface of the recessed housing portions.

7. The mold induction heating device according to claim 1,
wherein the jacket chambers of the upper plate and the lower plate are formed radially from a central portion of the metal plate body.

8. The mold induction heating device according to claim 1,
wherein the mold is a mold for tire vulcanization.

* * * * *